United States Patent
Yang et al.

(10) Patent No.: US 9,532,323 B2
(45) Date of Patent: Dec. 27, 2016

(54) METHOD AND APPARATUS FOR PERFORMING SYNCHRONIZATION IN BASE STATION AND USER EQUIPMENT

(75) Inventors: Tao Yang, Shanghai (CN); Seau Sian Lim, Swindon (GB)

(73) Assignee: Alcatel Lucent, Boulogne-Billancourt (FR)

( * ) Notice: Subject to any disclaimer, the term of this patent is extended or adjusted under 35 U.S.C. 154(b) by 204 days.

(21) Appl. No.: 14/115,172

(22) PCT Filed: Apr. 25, 2012

(86) PCT No.: PCT/IB2012/000988
§ 371 (c)(1),
(2), (4) Date: Nov. 1, 2013

(87) PCT Pub. No.: WO2012/172399
PCT Pub. Date: Dec. 20, 2012

(65) Prior Publication Data
US 2014/0071949 A1 Mar. 13, 2014

(30) Foreign Application Priority Data
May 2, 2011 (CN) .......................... 2011 1 0114697

(51) Int. Cl.
*H04W 74/08* (2009.01)
*H04W 56/00* (2009.01)

(52) U.S. Cl.
CPC ....... *H04W 56/001* (2013.01); *H04W 56/0045* (2013.01); *H04W 74/0833* (2013.01)

(58) Field of Classification Search
None
See application file for complete search history.

(56) References Cited

U.S. PATENT DOCUMENTS

| | | | |
|---|---|---|---|
| 2011/0075629 A1 | 3/2011 | Seo et al. | |
| 2012/0008600 A1* | 1/2012 | Marinier | H04L 5/001 370/336 |
| 2012/0257513 A1* | 10/2012 | Yamada | H04L 1/0618 370/248 |
| 2013/0250902 A1 | 9/2013 | Xu et al. | |

FOREIGN PATENT DOCUMENTS

| | | |
|---|---|---|
| CN | 102014477 A | 4/2011 |
| CN | 102036411 | 4/2011 |
| WO | WO 2010/062060 | 6/2010 |

OTHER PUBLICATIONS

Initial Consideration on Multiple TA, 3GPP TSG RAN WG2 Meeting #73, R2-111840, Apr. 11-15, 2011.*
(Continued)

*Primary Examiner* — Yemane Mesfin
*Assistant Examiner* — Jeff Banthrongsack
(74) *Attorney, Agent, or Firm* — Fay Sharpe, LLP

(57) ABSTRACT

Embodiments of the present invention disclose a method and device for synchronization in base stations and user equipments. Specially, a method for synchronization in base stations is disclosed, which includes: dividing cells into one or more group(s) based on a predetermined rule, such that a Physical Random Access Channel (PRACH) procedure is performed with respect to a group from the one or more group(s) of cells, so as to acquire for a user equipment a Timing Advance (TA) for use in transmissions.

11 Claims, 6 Drawing Sheets

(56) References Cited

OTHER PUBLICATIONS

European Office Action dated Oct. 9, 2014.
Potevio: "Random Access on SCell for Supporting Multi-TA", 3GPP Draft; R2-113067; TSG-RAN WG2, Meeting #74, Barcelona, Spain: May 9-13, 2011.
Samsung: "Main issues in supporting multi-TAs", 3GPP Draft, R2-112305; TSG-RAN WG2, #73Bis, Shanghai, China, Apr. 11-15, 2011.
Intel Corporation, "Enhancements on MAC procedures to support CA with multiple TA", 3GPP Draft, TSG-RAN2#73; R2-112137; Shanghai, China, Apr. 11-15, 2011.
ZTE, "Discussion on Multiple TA", R2-111908, 3GPP TSG-RAN WG2 Meeting #73bis, Apr. 11-15, 2011, Shanghai, China.
Alcatel-Lucent, "The need of maintaining multiple TA timers", R2-112209, TSG-RAN WG2#73bis, Apr. 11-15, 2011, Shanghai, China.
New Postcom, "Analysis of basic Multi-TA requirements for CA", R2-113137, 3GPP TSG-RAN2#74, May 9-13, 2011, Barcelona, Spain.
Potevio, "Signalling for TA group configuration", R2-115812, 3GPP TSG-RAN WG2 Meeting #76, Nov. 14-18, 2010, San Francisco, USA.
Qualcomm Incorporated, "Supporting multiple timing advance groups", R2-100423, 3GPP TSG-RAN WG2 meeting#68bis, Valencia, Spain, Jan. 18-22, 2010.
Potevio, "Multi-TA assignment", R2-113069, 3GPP TSG-RAN WG2 Meeting #74, Barcelona, Spain, May 9-13, 2011.
CATT, "Initial Consideration on Multiple TA," $3^{rd}$ Generation Partnership Project (3GPP), 3GPP TSG RAN WG2 Meeting #73bis, R2-111840, pp. 1-2, Shanghai, China, Apr. 11-15, 2011.
Alcatel-Lucent et al., "Scell configuration for multiple TA," $3^{rd}$ Generation Partnership Project (3GPP), 3GPP TSG RAN WG2 #73bis, R2-112210, pp. 1-2, Shanghai, China, Apr. 11-15, 2011.
Nokia Siemens Networks, "Multiple timing advance," $3^{rd}$ Generation Partnership Project (3GPP), 3GPP TSG RAN WG2 Meeting #73bis, R2-111897, pp. 1-4, Shanghai, China, Apr. 11-15, 2011.
Alcatel-Lucent et al., "DL reference & the need of TA grouping for multiple TA," $3^{rd}$ Generation Partnership Project (3GPP), 3GPP TSG RAN WG2 #73bis, R2-112208, pp. 1-3, Shanghai, China, Apr. 11-15, 2011.
International Search Report for PCT/IB2012/000988 dated Oct. 4, 2012.

\* cited by examiner

Apparatus for performing synchronization in a base station 500

Cell group dividing means 501

Fig. 5

Apparatus for performing synchronization in user equipment 600

PRACH procedure performing means 601

Fig. 6

METHOD AND APPARATUS FOR PERFORMING SYNCHRONIZATION IN BASE STATION AND USER EQUIPMENT

FIELD OF THE INVENTION

Embodiments of the present invention relate to the field of communication. In particular, embodiments of the present invention relate to methods and apparatuses for performing synchronization in a base station and user equipment.

BACKGROUND OF THE INVENTION

In the field of communication, user equipment has to perform in advance a Physical Random Access Channel (PRACH) procedure due to differences between locations and moving speeds of a plurality of user equipment within a cell, so as to perform uplink communications with a base station. During the PRACH procedure, the user equipment sends a Preamble to the base station on a PRACH channel. Because the base station knows at which position and which time the PRACH channel should appear, the base station can calculate, based on the position and time at which the PRACH channel appears as well as the time when the Preamble sent by the user equipment is actually received on the PRACH channel, a Timing Advance (TA) for the user equipment, and provides to the user equipment the TA in a response message. Afterwards, the user equipment can utilize the TA to perform uplink communications with the base station before a triggering condition which requires obtaining the TA occurs again.

In Release 10 (R10) of an LTE (Long Term Evolution) system (for example, a system 100 as shown in FIG. 1), a base station 101 allocates to a user equipment a Primary Cell (Pcell) 102 that provides services to the user equipment. In some conditions, the base station 101 may further have to allocate one or more of Secondary Cells (Scells) 103a, 103b, and 103c (generally called a Scell 103) to the user equipment. As known to those skilled in the art, in R10, both the cell 102 and cell 103 use the same TA as being located in a same frequency band. Thus, the user equipment needs not performing multiple PRACH procedures in these cells in order to perform uplink communications within respective cells. Generally, it is sufficient to only perform the PRACH procedure once on the Pcell 102, and the obtained TA may be equivalently used by the Scell 103.

SUMMARY OF THE INVENTION

However, the inventors find that in R11 of the LTE system (for example, system 200 as shown in FIG. 2), various scenes exist such that TAs used by the Pcell and respective Scells are different. For example, these cells may locate on different frequency bands. Of course, this is only an exemplary scene. In order to perform uplink communications, the most direct solution is that the user equipment performs PRACH procedures in respective cells so as to obtain corresponding TAs specific to the cells. Apparently, this approach increases the numbers of TAs and timeAlignment-Timers (TATs) that have to be maintained, and also increases overheads of PRACH procedures.

To solve this problem, embodiments of the present invention provide a method for performing synchronization in a base station, which can include: dividing cells into one or more group(s) based on a predetermined rule, such that a PRACH procedure is performed with respect to a group from the one or more group(s) of cells, so as to acquire for a user equipment a TA for use in transmissions.

In another aspect, embodiments of the present invention provide a method for performing synchronization in a user equipment, comprising: performing a PRACH procedure with respect to a group of cells, so as to acquire a TA for use in transmissions.

In a further aspect, embodiments of the present invention provide an apparatus for performing synchronization in a base station, comprising: cell group dividing means configured to divide cells into one or more group(s) based on a predetermined rule, such that a PRACH procedure is performed with respect to a group from the one or more group(s) of cells, so as to acquire for a user equipment a TA for use in transmissions.

In a still further aspect, embodiments of the present invention provide an apparatus for performing synchronization in a user equipment, comprising: PRACH procedure performing means configured to perform a PRACH procedure with respect to a group of cells, so as to acquire a TA for use in transmissions.

Advantages of the present invention lie in: by dividing cells into one or more group(s) based on a predetermined rule, the numbers of TAs and TATs are reduced, and overheads of the PRACH procedure are also decreased.

Of course, these advantages are only exemplary, and other more advantages of the present invention would be appreciated by those skilled in the art.

BRIEF DESCRIPTION OF THE DRAWINGS

Through reading the following detailed description with reference to the accompanying drawings, the above and other objectives, features and advantages of the embodiments of the present invention will become more comprehensible. In the drawings, a plurality of embodiments of the present invention will be illustrated in an exemplary and non-limiting manner, wherein:

FIG. 5 is a block diagram illustrating an apparatus for performing synchronization in a base station according to an embodiment of the present invention.

FIG. 6 is a block diagram illustrating an apparatus for performing synchronization in a user equipment according to an embodiment of the present invention.

DETAILED DESCRIPTION OF THE PREFERRED EMBODIMENTS

Hereinafter, the principle and spirit of the present invention will be described with reference to various exemplary embodiments. It should be understood that provision of these embodiments is only to enable those skilled in the art to better understand and further implement the present invention, not intended for limiting the scope of the present invention in any manner.

Embodiments of the present invention provide methods and apparatuses for performing synchronization in a base station and user equipment.

Hereinafter, the principle and spirit of the present invention will be described in detail with reference to a plurality of representative embodiments of the present invention.

Figure 1:
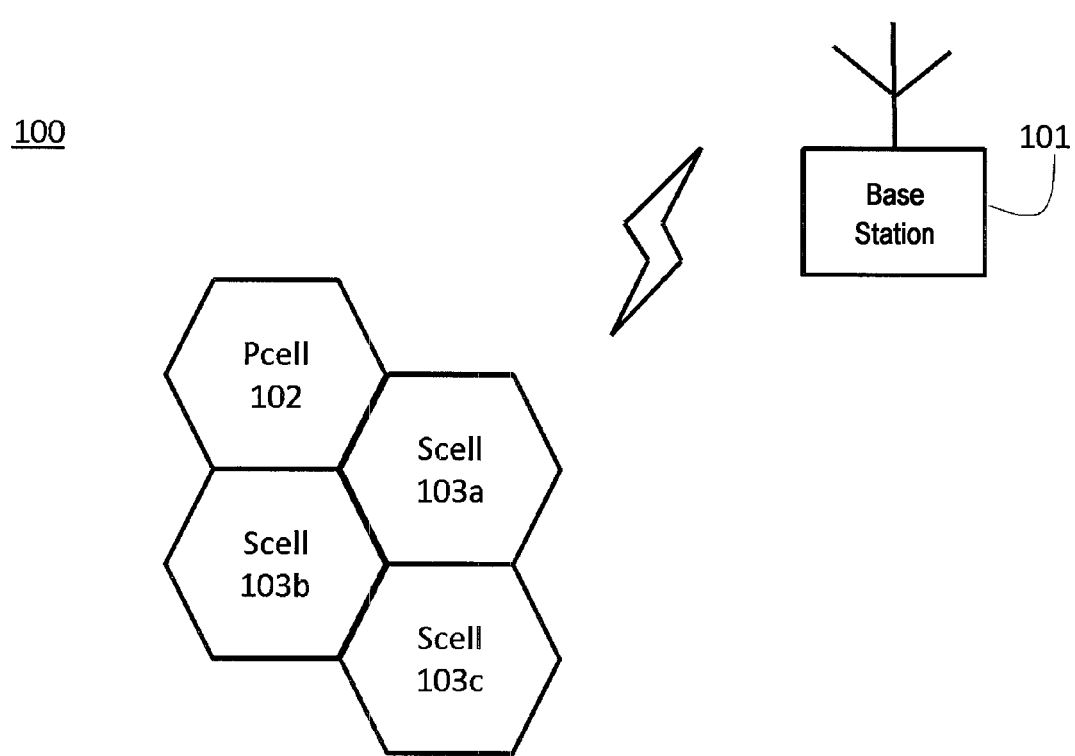
FIG. 1 is a schematic diagram illustrating a system comprising a base station and cells served by the base station in the prior art.
Figure 2:
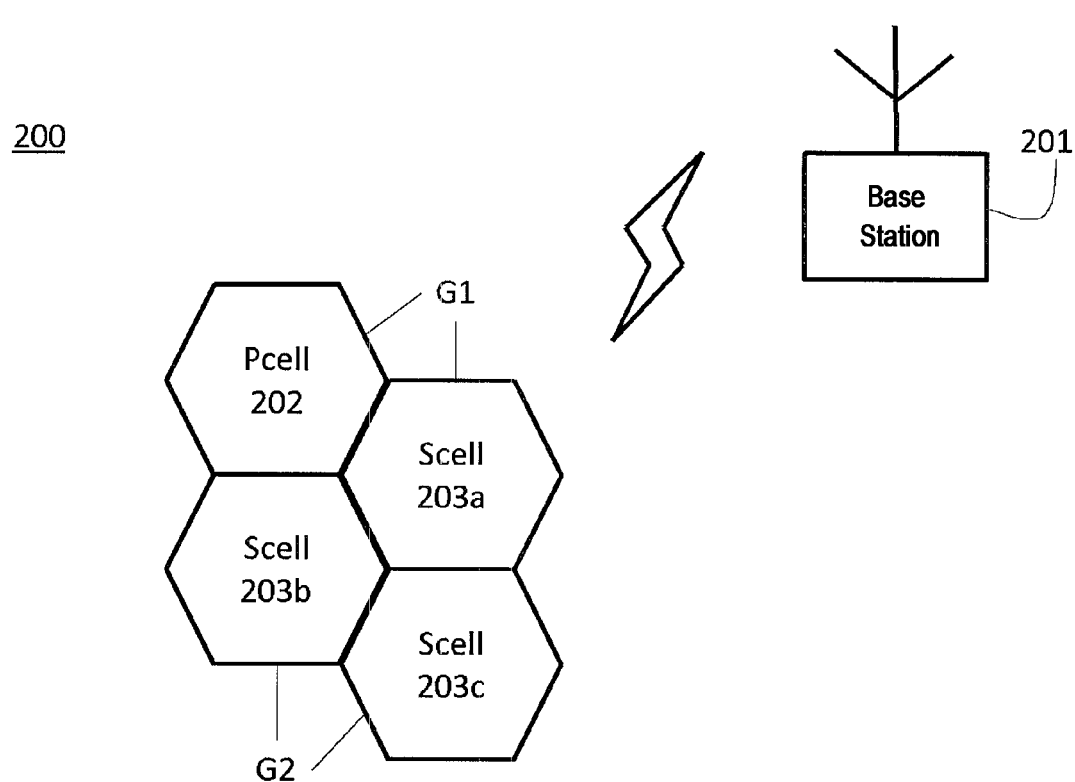
FIG. 2 is a schematic diagram illustrating a system comprising a base station and cells served by the base station according to an embodiment of the present invention.
Figure 3:
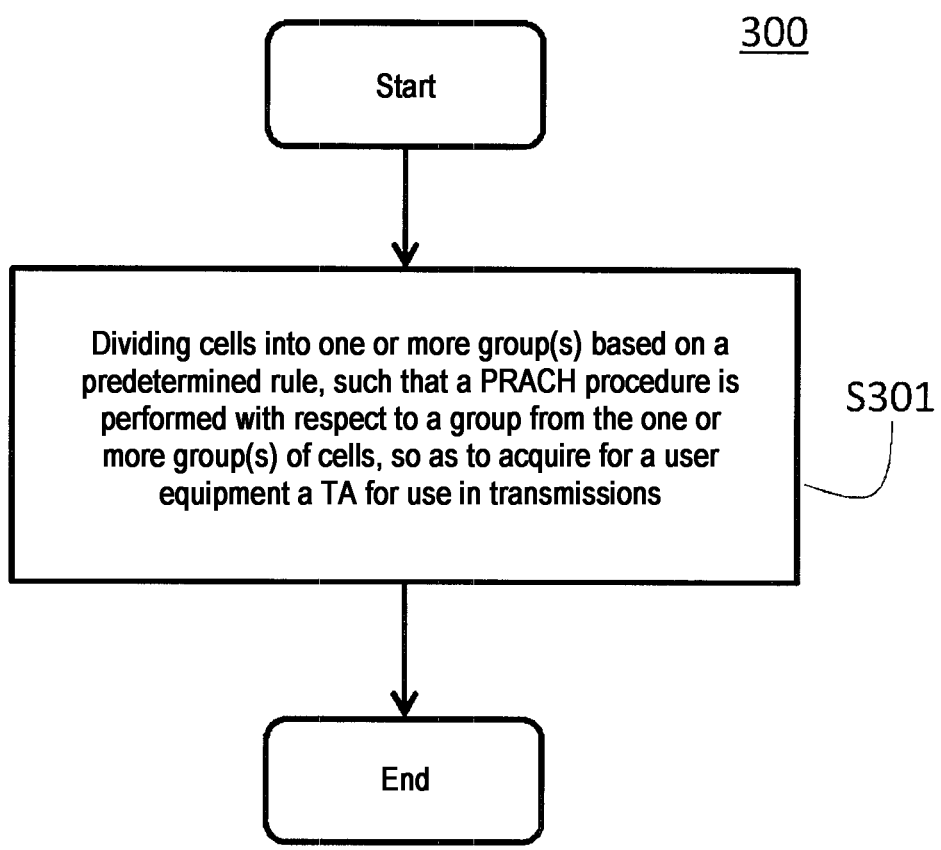
FIG. 3 is a flow chart illustrating a method for performing synchronization in a base station according to an embodiment of the present invention.

First, referring to FIG. 3 in conjunction with FIG. 2, FIG. 2 illustrates a schematic diagram of a system 200 comprising a base station and cells served by the base station according to an embodiment of the present invention; while FIG. 3 illustrates a flow chart of a method 300 for performing synchronization in a base station according to an embodiment of the present invention.

As illustrated in FIG. 3, the method 300 can include step S301, i.e., dividing cells into one or more group(s) based on a predetermined rule, such that a PRACH procedure is performed with respect to a group from the one or more group(s) of cells, so as to acquire for a user equipment a TA for use in transmissions.

Specifically referring to FIG. 2, as illustrated in FIG. 2, the base station 201 can divide, based on a predetermined rule, Pcell 202 and Scell 203a into a group G1, and Scell 203b and Scell 203c into a group G2, such that the user equipment performs a PRACH procedure with respect to group G1 or G2, instead of performing the PRACH procedure with respect to respective cells.

Of course, those skilled in the art would appreciate that in the figures, the number of cells as well as the number of cells included in a group is merely exemplary, not for limiting the present invention. Moreover, those skilled in the art would appreciate that the predetermined rule may be any rule defined by the base station or its operator, for example, dividing cells at the same frequency band into one group. Of course, this is only exemplary, and the present invention is not limited thereto.

Preferably, according to an embodiment of the present invention, the base station 201 may further provide a unique identification of a group. Those skilled in the art would appreciate that, in an extreme condition, for example, only one group of cells exists for the user equipment, it would be unnecessary to provide a unique identification for the group. Accordingly, this step is optional but not compulsory.

According to an embodiment of the present invention, a unique identification may, for example, be a cell index of a cell in a group or an index of the group. Of course, those skilled in the art can understand, the above is merely exemplary, not for limiting the present invention. Those skilled in the art would contemplate that any identification that can uniquely identify a group may be used in the present invention.

It is seen from FIG. 2 that, the group G1 for example includes Pcell 202 and Scell 203a. In other words, the group G1 includes at least a primary cell.

For this kind of group, according to some embodiments of the present invention, if the unique identification of a group is a cell index of a cell in the group, then the unique identification of the group G1 in FIG. 2 may, for example, be the cell index of the primary cell Pcell 202, i.e., 0 (it is known to those skilled in the art that the index for a primary cell is 0).

According to some embodiments of the present invention, if the unique identification of a group is the index of the group, then the unique identification of the group G1 in FIG. 2, for example, may be preferably set to 0. As known to those skilled in the art, the establishment of Pcell is implemented through a RRC connection establishment message. If the unique identification of the group G1 is set to 0, then it is unnecessary to modify the RRC connection establishment message of Pcell, which is advantageous.

However, for a Scell, those skilled in the art would appreciate that, when allocating a Scell to a user equipment, the base station may add, to a Radio Resource Re-configuration (RRC) message for use in configuring a secondary cell, an index field for representing an identification of the group to which the Scell belongs. It is easily understood that, when the Scell belongs to a group that includes a Pcell, the identification of the group to which the Scell belongs is preferably set to 0, regardless of being represented by the cell index or the group index.

Those skilled in the art would appreciate that, such a group including a Pcell has no difference from cells as a whole in the R10 system, and thus an approach may preferably be adopted which is identical to that of performing the PRACH procedure in the R10 system. That is, the user equipment performs the PRACH procedure on the Pcell, so as to acquire a TA that is applicable for any cell in the group. Because of the above reasons, this will not be detailed here.

It is further seen from FIG. 2 that, for example, the group G2 can include Scell 203b and Scell 203c. In other words, the group G2 merely includes secondary cells.

For such kind of group, according to some embodiments of the present invention, if a group is uniquely identified through assigning a new index to the group, then it would be unnecessary to differentiate levels of secondary cells in the group (as described below, a certain cell among secondary cells may be designated as a primary secondary cell, while other secondary cells are normal secondary cells). In other words, all secondary cells are normal secondary cells at the same level. In this case, for example, preferably, the unique identification of group G2 can be arbitrarily designated in a RRC message for use in configuring secondary cells (and its value is subjected to no limitation). Specifically, the base station adds, to the RRC message for use in configuring secondary cells, an index field for representing the identification of the group to which the Scell belongs.

In such case that a primary secondary cell does not exist, the user equipment may perform PRACH procedures on all or any arbitrary number (designated by the base station based on any rule) of secondary cells in the group. Preferably, when one PRACH procedure among the PRACH procedures succeeds, other unfinished PRACH procedures end immediately, so as to save PRACH overheads. The TA acquired through the successful PRACH procedure can be made available to other Scells.

If a cell index of a cell in a group is used to uniquely identify the group, then preferably, a primary secondary cell in the group is designated such that the cell index of primary secondary cell can be used as the identification of the group. For example, in FIG. 2, it may be supposed that the Scell 203b is selected as the primary secondary cell for the G2 group; therefore, the cell index of Scell 203b can be used as the identification of group G2. Those skilled in the art would appreciate that if the base station determines that the Scell 203c belongs to the group of Scell 203b when allocating the Scell 203c to the user equipment, then a field representing the cell index of Scell 203b is added to a RRC message for the Scell 203c, so as to explicitly indicate that the Scell 203c belongs to the group of Scell 203b.

In the case that a primary secondary cell has been designated, the PRACH procedure is preferably performed on the primary secondary cell (Scell 203b in this example). Of course, those skilled in the art would appreciate that the PRACH procedure may also be performed in a same approach as in the case that a primary secondary cell has not been designated. That is, the user equipment may perform the PRACH procedure on all or any arbitrary number (designated by the base station based on any rule) of secondary cells in the group. Preferably, when one PRACH procedure succeeds, other unfinished PRACH procedures end immediately so as to save PRACH overheads. The TA acquired through the successful PRACH procedure can be made available to other Scells.

According to some embodiments of the present invention, the PRACH procedure can be triggered in the following cases: in the case of the unique identification of a group being a cell index, if the index allocated to the identification of the group to which a secondary cell belongs is identical to the cell index allocated to the secondary cell when the base station allocates the secondary cell to the user equipment; or in the case of the unique identification of a group being the index of the group, if the index of the group to which a secondary cell belongs is different from any existing group index when the base station allocates the second cell to the user equipment.

Those skilled in the art would appreciate that the above two cases both show that a secondary cell being allocated currently by the base station to the user equipment does not belong to any existing group, but forming a new group on its own. In this case, the user equipment knows that it is necessary to perform the PRACH procedure on that secondary cell so as to acquire a TA; otherwise, it would be impossible to perform subsequent operations with the base station.

In other embodiments of the present invention, the base station, for example, can send a Physical Dedicated Control Channel (PDCCH) order signaling so as to trigger the PRACH procedure.

Those skilled in the art would appreciate that, for G1 group, the PDCCH order signaling can be sent on the primary cell.

While for the G2 group with a designated primary secondary cell, the PDCCH order signaling can be sent on the primary secondary cell, or on other cells in an active state (for example, Scell 203*b* in this example), but its Carrier Indication Field (CIF) points to the primary secondary cell so as to notify the user equipment that it is necessary to perform the PRACH procedure on the primary secondary cell.

Further, in the group G2 without a designated primary secondary cell, the PDCCH order signaling can be sent on any secondary cell in an active state within the group G2, or any other cells in an active state outside of G2 group, but its CIF points to any arbitrary secondary cell within the group or its CIF points to the group.

According to some embodiments of the present invention, in the case of the primary secondary cell being de-configured, one of other secondary cells in the group needs to be re-selected as the primary secondary cell. This is because it is needed to use the cell index of the primary secondary cell to identify the group where it is located, and to send the PDCCH order signaling on the primary secondary cell. If the primary secondary cell does not exist, it is naturally necessary to re-designate a primary secondary cell.

However, according to some embodiments of the present invention, the de-activation of a primary secondary cell has no impact on identifying the group, because the primary secondary cell continues existing; therefore, its cell index can be continuously used. However, in order to ensure sending the PRACH thereon, according to an embodiment of the present invention, it is required that: the PDCCH order signaling should be sent on other cells in an active state, while the CIF of the signaling points to the de-activated primary secondary cell or instructs that the PDCCH order signaling should be sent on the de-activated primary secondary cell continuously.

According to some embodiments of the present invention, there are two approaches of selecting a primary secondary cell: first, the base station identifies a secondary cell as the primary secondary cell during a secondary cell configuration RRC message, wherein the identifying manner can be arbitrary, for example, adding in the message a field that indicates the level of the cell (i.e., a primary secondary cell or a normal secondary cell), but the present invention is not limited thereto; second, the user equipment selects a secondary cell as a primary secondary cell based on a predetermined criterion. Of course, these are only exemplary, and the present invention is not limited thereto.

For the second case, for example, the user equipment can select the secondary cell with the highest or lowest index value among the secondary cells as the primary secondary cell. This selection may be shared with the base station based on the synchronization between the user equipment and the base station. In this case, the following condition may occur, i.e., if a new secondary cell which is allocated by the base station to the user equipment based on a predetermined criterion and belongs to the group should become a primary secondary cell, then the user equipment selects the new secondary cell as the primary secondary cell, while the previous primary secondary cell becomes a normal secondary cell in the group.

After introducing the method performed by the base station, a method for performing synchronization in a user equipment will be described with reference to FIG. 4.

Figure 4:
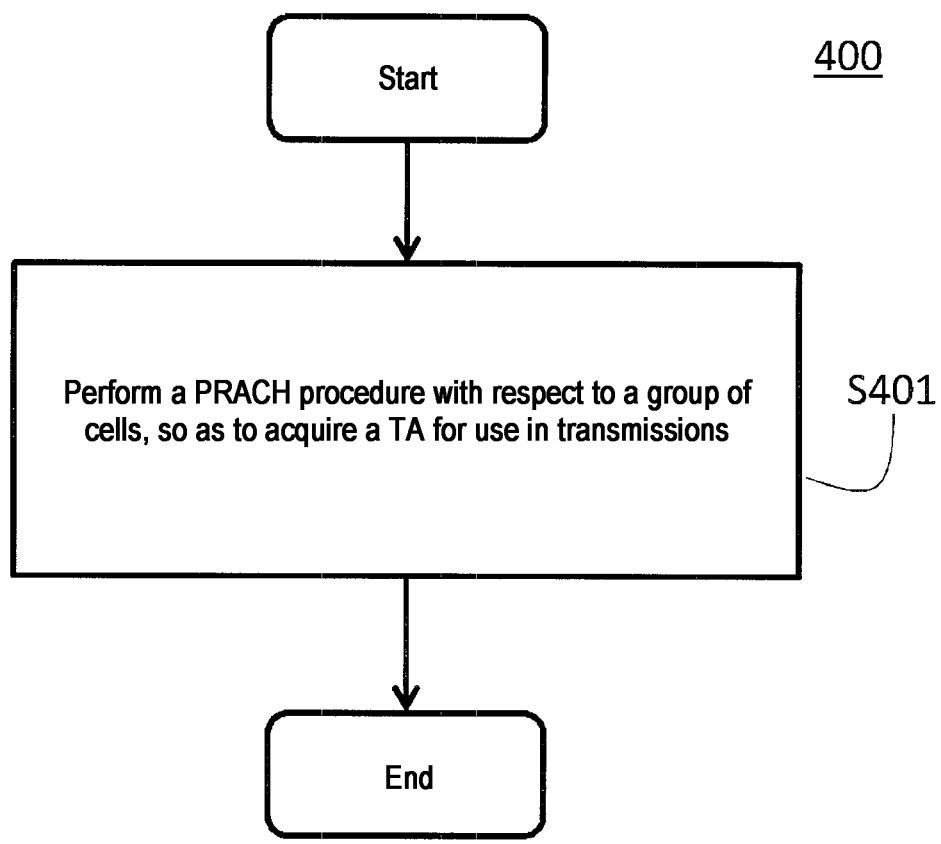
FIG. 4 is a flow chart illustrating a method for performing synchronization in a user equipment according to an embodiment of the present invention.

It is seen from FIG. 4 that a method 400 can comprise step S401, i.e., performing a PRACH procedure with respect to a group of cells, so as to acquire a TA for use in transmissions.

According to some embodiments of the present invention, in the case that the group includes a primary cell, the PRACH procedure can be performed on the primary cell.

According to some embodiments of the present invention, in the case that the group merely includes secondary cells, the PRACH procedure can be performed on the secondary cells till the PRACH procedure succeeds.

According to some embodiments of the present invention, one of the secondary cells can be selected as a primary secondary cell based on a predetermined criterion. In this case, the PRACH procedure can be performed on the primary secondary cell.

Next, referring to FIG. 5, it illustrates a block diagram of an apparatus 500 for performing synchronization in a base station according to an embodiment of the present invention.

Specifically, it is seen from FIG. 5 that it, for example, comprises a cell group dividing means 501 configured to divide cells into one or more group(s) based on a predetermined rule, such that a PRACH procedure is performed with respect to a group from the one or more group(s) of cells, so as to acquire for a user equipment a TA for use in transmissions.

Those skilled in the art would appreciate that the apparatus 500 can comprise other means not shown in the figure, and functions of these means are similar to the functions of the method as described above with reference to FIGS. 2 and 3, which will not be detailed here.

Next, referring to FIG. 6, it illustrates a block diagram of an apparatus 600 for performing synchronization in a user equipment according to an embodiment of the present invention.

Specifically, it is seen from FIG. 6 that it, for example, can comprise PRACH procedure performing means 601 configured to perform a PRACH procedure with respect to a group of cells, so as to acquire a TA for use in transmissions.

Those skilled in the art would appreciate that the apparatus 600 can comprise other means not shown in the figure, and functions of these means are similar to the functions of the method as described above with reference to FIG. 4, which will not be detailed here.

Figure 7:
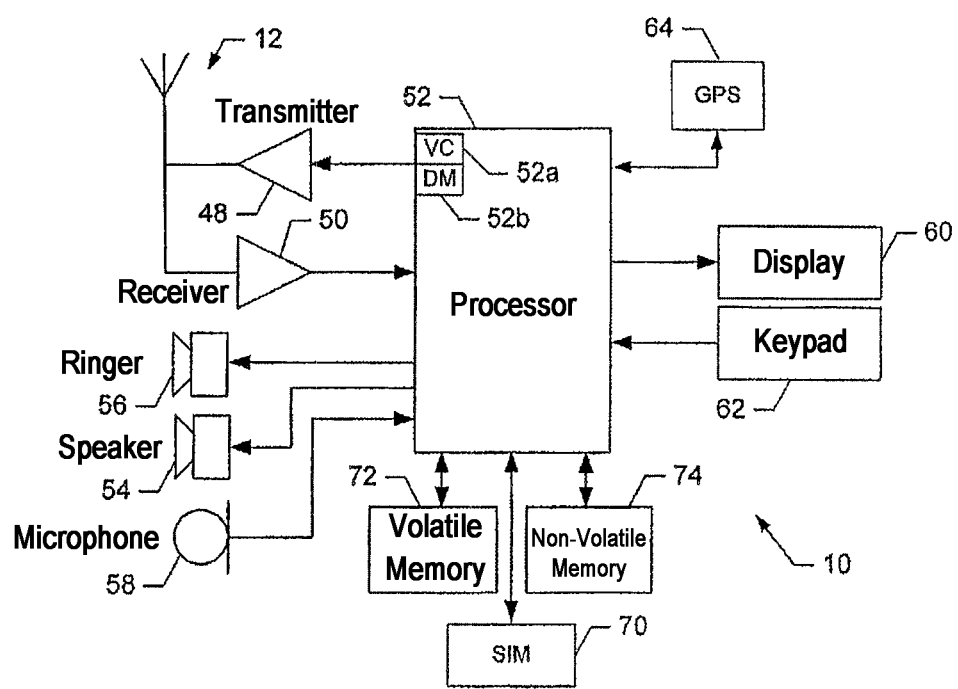
FIG. 7 illustrates a diagram of a class of apparatuses that would benefit from embodiments of the present invention.

Finally, referring to FIG. 7, it illustrates a diagram of a class of apparatuses that would benefit from the embodiments of the present invention, for example, a mobile station 10, and more specifically, for example, a mobile phone. However, it should be noted that the illustrated and to-be-described mobile station hereinafter merely illustrates a class of mobile stations that would benefit from the present invention, which thus should not be interpreted as limiting the scope of the present invention. Although a plurality of embodiments of the mobile station will be described hereinafter for the exemplary purposes, other apparatuses such as a portable digital assistant (PDA), a pager, a laptop, and other kind of electronic system may also easily apply the embodiments of the present invention.

The mobile station 10 comprises various means that perform one or more functions according to the exemplary embodiments of the present invention, including those means that are illustrated and described here. However, it should be understood that without departing from the spirit and scope of the present invention, the mobile station may comprise optional means for performing one or more similar functions. More specifically, for example, as illustrated in FIG. 6, besides an antenna 12, the mobile station further comprises a transmitter 48, a receiver 50, and a processor 52, where the processor 52 provides signals to the transmitter and receiver, respectively, and receives signals from the transmitter and receiver. These signals comprise signaling information according to applicable air interface standards for the cellular system, and also comprise user voice and/or data generated by the user. In this regard, the mobile station may operate by utilizing one or more air interface standards, communication protocols, modulation types, and access types. More specifically, the mobile station may operate according to any protocol among various first generation (1G), second generation (2G), 2.5G, and/or third generation (3G) communication protocols. For example, the mobile station may operate according to the 2G wireless communication protocols IS-136 (TDMA), GSM, and IS-95 (CDMA). For another example, the mobile station may operate according to the 2.5G wireless communication protocols GPRS, EDGE, etc. For another example, the mobile station may operate according to the 3G wireless communication protocols, for example, applying the UMTS network in the WCDMA wireless access technology. Just like a dual-mode or higher-mode phone (for example, digital/analog or TDMA/CDMA/analog phones), some NAMPS and TACS mobile stations may also benefit from the teaching of the present invention.

It should be understood that the processor 52 comprises a circuit required for implementing audio and logical functions of the mobile station 10. For example, the processor may comprise a digital signal processor device, a microprocessor device, various kinds of A/D converters, D/A converters, and other support circuits. The control and signal processing functions of the mobile station are distributed between these devices according to their corresponding capacities. The processor may additionally comprises an internal voice coder (VC) 52a and may comprise an internal data modem (DM) 52b. Further, the processor may comprise a function capable of operating one or more software programs stored in the memory (which will be described hereinafter).

The mobile station 10 also comprises a user interface that comprises a conventional earphone or speaker 54, ringer 56, microphone 58, display 60, and a user input interface, all of which are coupled to the processor 52. Although not shown, the mobile station may comprise a battery for supplying power to various circuits required by operating the mobile station and optionally provides mechanical vibration as detectable outputs. A user input interface allowing the mobile station to receive data may comprise any device in a plurality of devices that allow the mobile station to receive data, for example, a keypad 62, a touch display (not shown), a joystick (not shown) and other input devices. In the exemplary embodiments comprising a keypad, the keypad comprises conventional digit (0-9) and other relevant keys (#, *), and other keys for operating the mobile station.

The mobile station 10 may further comprise a memory, for example, a memory such as a Subscriber Identification Module (SIM) 70, Removable User Identification Module (R-UIM) and the like, which memory generally stores information elements associated with the mobile user. Besides the SIM, the mobile station may comprise other removable and/or fixed memory. In this regard, the mobile station may comprise a volatile memory 72, for example, a volatile Random Access Memory (RAM), which comprises a cache area for temporarily storing data. The mobile station may further comprise other non-volatile memory 74 which may be embedded and/or removable. The non-volatile memory may additionally or alternatively include for example, EEPROM and flash memory, etc. The memory may store any plurality of software applications, instructions, a plurality of pieces of information and data that may be used by the mobile station to implement the mobile station's functions. According to the embodiments of the present invention, for example, a memory of a non-volatile memory 74 of mobile station 10 may store software and other data and/or settings required for implementing one or more features. At this point, each feature generally relates to the corresponding function that is executable when the mobile station is executing software and/or using data and other settings. However, as used here, the term "feature" not only indicates relevant functions, but also indicates the bottom layer software and other data and/or settings stored in the memory. Although it is not necessary for implementing the present invention, before delivering the mobile station to the terminal user, various features may be stored in the memory. For example, during the manufacturing period or before being delivered to the terminal user, a certain other point of the mobile station is distributed. Before initiating the corresponding feature as described below, various data stored in the memory are disabled and thus cannot be operated by the mobile station. The status of each feature may be defined in various manners, for example, a flag associated with a corresponding feature is utilized to indicate whether the feature has been initiated or maintained being disabled.

Embodiments of the present invention can be implemented with software, hardware or the combination thereof. The hardware part can be implemented by a special logic; the software part can be stored in a memory and executed by a proper instruction execution system such as a microprocessor or a dedicated designed hardware. Those ordinarily skilled in the art may understand that the above apparatus and method may be implemented with computer-executable instructions and/or in processor-controlled codes, for example, such code is provided on a carrier medium such as a magnetic disk, CD, or DVD-ROM, or a programmable memory such as a read-only memory (firmware) or a data carrier such as an optical or electronic signal carrier. The apparatuses and their modules in the present invention may be implemented by a hardware circuitry such as a very large scale integrated circuit or gate array, a semiconductor such as a logical chip or transistor, or a programmable hardware device such as a field-programmable gate array, a programmable logical device or the like, or implemented by software executed by various kinds of processors, or implemented by the combination of the above hardware circuitry and software.

It should be noted that although a plurality of means or sub-means of the synchronization devices have been mentioned in the above detailed depiction, such partitioning is merely non-compulsory. In actuality, according to embodiments of the present invention, the features and functions of the above described two or more means may be embodied in one means. In turn, the features and functions of the above described one means may be further partitioned to be embodied in multiple means.

Besides, although operations of the present invention method are described in a particular order in the drawings, it does not require or imply that these operations must be performed according to this particular order, or a desired outcome can only be achieved by performing all shown operations. On the contrary, the execution sequences for the steps as depicted in the flowcharts may change. Additionally or alternatively, some steps may be omitted, a plurality of steps may be merged into one step, or a step may be divided into a plurality of steps for execution.

Although the present invention has been depicted with reference to a plurality of embodiments, it should be understood that the present invention is not limited to the disclosed embodiments. On the contrary, the present invention intends to cover various modifications and equivalent arrangements included in the spirit and scope of the appended claims. The scope of the appended claims meets the broadest explanations and covers all such modifications and equivalent structures and functions.

What is claimed is:

1. A method for performing synchronization in a base station, comprising:
dividing cells into one or more group(s) based on a predetermined rule, such that a Physical Random Access Channel (PRACH) procedure is performed with respect to a group from the one or more group(s) of cells, so as to acquire for a user equipment a Timing Advance (TA) for use in transmissions, wherein the group comprises at least a primary cell; and
a cell index is the cell index of the primary cell, while the index of the group is 0, or the group only comprises secondary cells, wherein in the case that the group only comprises secondary cells, the PRACH procedure is performed on the secondary cells until the PRACH procedure succeeds; or one of the secondary cells is selected as a primary secondary cell, and the PRACH procedure is performed on the secondary cells until the PRACH procedure succeeds, or the PRACH procedure is performed on the primary secondary cell, wherein the PRACH procedure is triggered in the following cases:
in the case of the unique identification of the group being a cell index, if the index allocated to the identification of the group to which a secondary cell belongs is identical to a cell index allocated to the secondary cell when the base station allocates the secondary cell to the user equipment;
in the case of the unique identification of the group being an index of the group, if the index of the group to which a secondary cell belongs is different from any existing group index when the base station allocates the second cell to the user equipment; or
in the case that the base station has sent a Physical Dedicated Control Channel (PDCCH) order signaling.

2. The method according to claim 1, further comprising: providing a unique identification of the group, and wherein the unique identification is a cell index of a cell in the group, or an index of the group.

3. The method according to claim 1, wherein in the case that one of the secondary cells is selected as a primary secondary cell, the cell index is a cell index of the primary secondary cell, while the index of the group is designated in a Radio Resource Re-configuration (RRC) message for use in configuring secondary cells.

4. The method according to claim 1, wherein the PDCCH order signaling is sent on any secondary cell in an active state within the group, or on any other cell in an active state outside of the group, but its CIF points to any secondary cell within the group or its CIF points to the group; or the PDCCH order signaling is sent on the primary secondary cell, or on other cells in an active state, but its Carrier Indication Field (CIF) points to the primary secondary cell, if one of the secondary cells is selected as the primary secondary cell.

5. The method according to claim 3, wherein in the case of the primary secondary cell being de-configured, one of other secondary cells in the group is re-selected as the primary secondary cell.

6. The method according to claim 4, wherein in the case of the primary secondary cell being de-activated, the PDCCH order signaling is sent on other cells in an active state, but its CIF points to the primary secondary cell, or the PDCCH order signaling is sent on the primary secondary cell that is de-activated.

7. The method according to claim 5, wherein selecting the primary secondary cell comprises:
identifying, by the base station, a secondary cell as the primary secondary cell during a secondary cell configuration RRC message, or selecting, by the user equipment, a secondary cell as the primary secondary cell based on a predetermined criterion.

8. The method according to claim 7, wherein in the case that the user equipment selects a secondary cell as the primary secondary cell based on a predetermined criterion, if a new secondary cell which is allocated by the base station to the user equipment based on a predetermined criterion and belongs to the group should become a primary secondary cell, then the new secondary cell is selected as the primary secondary cell, while the previous primary secondary cell becomes a normal secondary cell in the group.

9. A method for performing synchronization in a user equipment, comprising:
performing a Physical Random Access Channel (PRACH) procedure with respect to a group of cells, so as to acquire a Timing Advance (TA) for use in transmissions, wherein in the case that the group only comprises secondary cells, the PRACH procedure is performed on the secondary cells until the PRACH procedure succeeds; or further configured to select one of the secondary cells as a primary secondary cell based on a predetermined criterion, and the PRACH procedure is performed on the primary secondary cell, wherein the PRACH procedure is triggered in the following cases:

in the case of the unique identification of the group being a cell index, if the index allocated to the identification of the group to which a secondary cell belongs is identical to a cell index allocated to the secondary cell when the base station allocates the secondary cell to the user equipment;

in the case of the unique identification of the group being an index of the group, if the index of the group to which a secondary cell belongs is different from any existing group index when the base station allocates the second cell to the user equipment; or in the case that the base station has sent a Physical Dedicated Control Channel (PDCCH) order signaling.

10. An apparatus for performing synchronization in a base station, comprising:

a processor, the processor is configured to access memory configured to store a cell group configured to divide cells into one or more group(s) based on a predetermined rule, such that a PRACH procedure is performed with respect to a group from the one or more group(s) of cells, so as to acquire for a user equipment a Timing Advance (TA) for use in transmissions, wherein the group comprises at least a primary cell; and a cell index is the cell index of the primary cell, while the index of the group is 0, or the group only comprises secondary cells, wherein in the case that the group only comprises secondary cells, the PRACH procedure is performed on the secondary cells until the PRACH procedure succeeds; or one of the secondary cells is selected as a primary secondary cell, and the PRACH procedure is performed on the secondary cells until the PRACH procedure succeeds, or the PRACH procedure is performed on the primary secondary cell, wherein the PRACH procedure is triggered in the following cases:

in the case of the unique identification of the group being a cell index, if the index allocated to the identification of the group to which a secondary cell belongs is identical to a cell index allocated to the secondary cell when the base station allocates the secondary cell to the user equipment;

in the case of the unique identification of the group being an index of the group, if the index of the group to which a secondary cell belongs is different from any existing group index when the base station allocates the second cell to the user equipment; or in the case that the base station has sent a Physical Dedicated Control Channel (PDCCH) order signaling.

11. An apparatus for performing synchronization in a user equipment, comprising:

a processor, the processor configured to access memory and perform a Physical Random Access Channel (PRACH) procedure with respect to a group of cells, so as to acquire a Timing Advance (TA) for use in transmissions, wherein in the case that the group only comprises secondary cells, the PRACH procedure is performed on the secondary cells until the PRACH procedure succeeds, or comprising selecting one of the secondary cells as a primary secondary cell based on a predetermined criterion, and the PRACH procedure is performed on the primary secondary cell, wherein the PRACH procedure is triggered in the following cases:

in the case of the unique identification of the group being a cell index, if the index allocated to the identification of the group to which a secondary cell belongs is identical to a cell index allocated to the secondary cell when the base station allocates the secondary cell to the user equipment;

in the case of the unique identification of the group being an index of the group, if the index of the group to which a secondary cell belongs is different from any existing group index when the base station allocates the second cell to the user equipment; or in the case that the base station has sent a Physical Dedicated Control Channel (PDCCH) order signaling.

* * * * *